US012645540B2

(12) United States Patent
Shen et al.

(10) Patent No.: US 12,645,540 B2
(45) Date of Patent: Jun. 2, 2026

(54) INTERCONNECT ISOLATION SYSTEM AND METHOD FOR ISOLATING INTERCONNECT

(71) Applicant: MEDIATEK INC., Hsin-Chu (TW)

(72) Inventors: Jih-Sheng Shen, Hsinchu City (TW); Chung-Lun Huang, Hsinchu City (TW); Yi-Chen Lai, Hsinchu City (TW); Tsung-Han Yang, Hsinchu City (TW); Lin Liu, Hsinchu City (TW); Chung-Yuan Li, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/814,617

(22) Filed: Aug. 26, 2024

(65) Prior Publication Data

US 2026/0056842 A1     Feb. 26, 2026

(51) Int. Cl.
*G06F 11/00* (2006.01)
*G06F 11/07* (2006.01)
*G06F 11/14* (2026.01)

(52) U.S. Cl.
CPC ...... *G06F 11/1441* (2013.01); *G06F 11/0757* (2013.01)

(58) Field of Classification Search
None
See application file for complete search history.

(56) References Cited

U.S. PATENT DOCUMENTS

| | | | | |
|---|---|---|---|---|
| 2012/0102135 A1* | 4/2012 | Srinivasan | .......... | H04L 67/1027 718/1 |
| 2013/0297802 A1* | 11/2013 | Laribi | ................ | H04L 12/6418 709/226 |
| 2021/0200568 A1* | 7/2021 | Sharma | ............... | G06F 9/45558 |
| 2022/0300384 A1* | 9/2022 | Reznik | ............... | G06F 11/0751 |
| 2024/0036996 A1* | 2/2024 | Vijayan | ............... | G06F 11/2097 |

OTHER PUBLICATIONS

Alqarni et al., "LB-MAP: Load-Balanced Middlebox Assignment in Policy-Driven Data Centers," 2017 26th International Conference on Computer Communication and Networks (ICCCN), Vancouver, BC, Canada, 2017, pp. 1-9 (Year: 2017).*
Ren et al., "Resource Scheduling in Cloud Computing Based on Firefly Algorithm," 2019 IEEE IUCC and DSC) and Smart Computing, Networking and Services (SmartCNS), Shenyang, China, 2019, pp. 638-643 (Year: 2019).*

(Continued)

*Primary Examiner* — Bryce P Bonzo
*Assistant Examiner* — Gabriella Kanani Shelton
(74) *Attorney, Agent, or Firm* — Winston Hsu

(57) ABSTRACT

An interconnect isolation system includes a shared memory, at least one processing circuit, and an interconnect. The at least one processing circuit is arranged to execute a plurality of virtual machines (VMs). The interconnect is shared by the plurality of VMS, and includes at least one interconnect node. The at least one interconnect node includes at least one transmission circuit, wherein each of the at least one transmission circuit comprises a plurality of virtual links, the plurality of VMs are mapped to the plurality of virtual links, and each of the plurality of VMs transmits a transaction to the shared memory through a mapped virtual link.

20 Claims, 5 Drawing Sheets

(56) References Cited

OTHER PUBLICATIONS

Aral et al., "Subgraph Matching for Resource Allocation in the Federated Cloud Environment," 2015 IEEE 8th International Conference on Cloud Computing, New York, NY, USA, 2015, pp. 1033-1036 (Year: 2015).*

Lei et al., "A multi-objective scheduling strategy based on MOGA in cloud computing environment," 2012 IEEE 2nd International Conference on Cloud Computing and Intelligence Systems, Hangzhou, China, 2012, pp. 386-391 (Year: 2012).*

* cited by examiner

INTERCONNECT ISOLATION SYSTEM AND METHOD FOR ISOLATING INTERCONNECT

BACKGROUND

The present invention is related to interconnect isolation, and more particularly, to an interconnect isolation system that achieves the interconnect isolation with aid of mapping between a plurality of virtual machine (VMs) and a plurality of virtual links, and an associated method.

For an electronic system that utilizes multiple VMs or multi-threading (e.g., an automotive electronic system and a multi-core system), a memory y isolation mechanism is usually implemented through a memory management unit (MMU) to isolate memory areas for use by different VMs and prevent interference between VMs running different tasks, wherein each of the VMs may be defined by different hardware engines and software for different applications (e.g., multimedia, networking, and adaptive cruise control (ACC)). For an existing system, the VMs share the same interconnect to receive and transmit transactions and transaction responses. Some problems may occur, however. For example, if an error occurs in one of the VMs, the error may propagate to other parts of the system and cause the entire system to crash. In other words, when an error occurs in only one VM, the system needs to be reset/restarted at a system level, which seriously affects the system robustness.

SUMMARY

It is therefore one of the objectives of the present invention to provide an interconnect isolation system and an associated method, to address the above-mentioned issues.

According to an embodiment of the present invention, an interconnect isolation system is provided. The interconnect isolation system comprises a shared memory, at least one processing circuit, and an interconnect. The at least one processing circuit is arranged to execute a plurality of VMs. The interconnect is shared by the plurality of VMs, and comprises at least one interconnect node. The at least one interconnect node comprises at least one transmission circuit, wherein each of the at least one transmission circuit comprises a plurality of virtual links, the plurality of VMs are mapped to the plurality of virtual links, and each of the plurality of VMs transmits a transaction to the shared memory through a mapped virtual link.

According to an embodiment of the present invention, a method for isolating an interconnect is provided, wherein the interconnect is shared by a plurality of VMs, and comprises a plurality of virtual links. The method comprises: mapping the plurality of VMs to the plurality of virtual links, wherein for each of the plurality of VMS, a transaction is transmitted to a shared memory through a mapped virtual link.

One of the benefits of the present invention is that, by isolating an interconnect with aid of mapping between VMs and virtual links in the interconnect, under a condition that any of the VMs fails, the mapped virtual link(s) can be recovered without affecting other VMs and/or other interconnect paths. That is, the interconnect isolation system of the present invention supports a recovery mechanism (e.g., a self-reset function) for each of the virtual links, which can greatly improve the robustness of the interconnect. In addition, compared with a case where multiple dedicated physical links of the VMs are utilized to achieve the interconnect isolation, the present invention has a lower power cost and a smaller hardware area. Additionally, the present invention can simplify a debugging operation by identifying an error through the virtual links that are independent of each other.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ".

Figure 1:
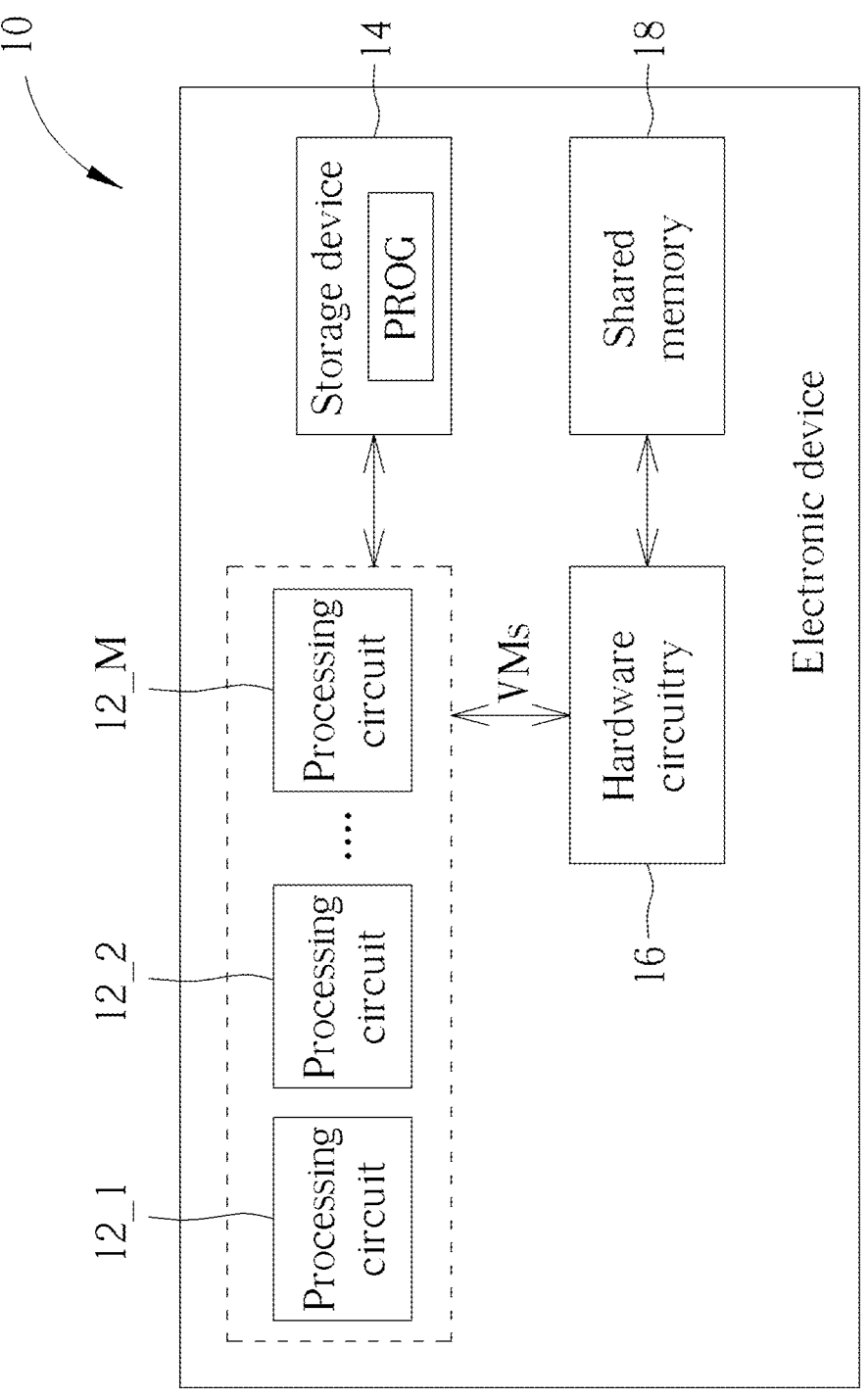
FIG. 1 is a diagram illustrating an electronic device according to an embodiment of the present invention.

FIG. 1 is a diagram illustrating an electronic device 10 according to an embodiment of the present invention. By way of example, but not limitation, the electronic device 10 may be a portable device such as a smartphone or a tablet. The electronic device 10 may include at least one processing circuit (e.g., multiple processing circuits 12_1-12_M), a storage device 14, a hardware circuitry 16, and a shared memory 18, wherein "M" is an integer greater than one. Examples of each of the processing circuits 12_1-12_M may include, but are not limited to: a hardware engine, a processor, or a dedicated hardware circuit. The storage device 14 is a computer-readable medium, and is arranged to store computer program code PROG. The processing circuits 12_1-12_M are equipped with software execution capability. The computer program code PROG may include a plurality of software modules. Hence, when loaded and executed by the processing circuits 12_1-12_M, the computer program code PROG instructs the processing circuits 12_1-12_M to perform designated functions of the software modules. For example, the computer program code PROG instructs each of the processing circuits 12_1-12_M to execute a plurality of virtual machines (VMs) for different applications. The electronic device 10 may be regarded as a computer system using a computer program product that includes a computer-readable medium containing the computer program code PROG. The hardware circuitry 16 is pure hardware that may consist of logic gates only, and performs designated functions without software execution. For example, the hardware circuitry 16 may be an interconnect between the VMs and the shared memory 18, wherein the interconnect is shared by the VMs, and each of the VMs may transmit a transaction to the shared memory 18 or receive a transaction response from the shared memory 18 through the interconnect. Regarding an interconnect isolation system as proposed by the present invention, it may be embodied on the electronic device 10. For example, the interconnect isolation system may include software-based functions implemented by computer program code PROG running on the processing circuits 12_1-12_M (e.g., the VMs), hardware-based functions implemented by the hardware circuitry 16 (e.g., the interconnect), and the shared memory 18.

Figure 2:
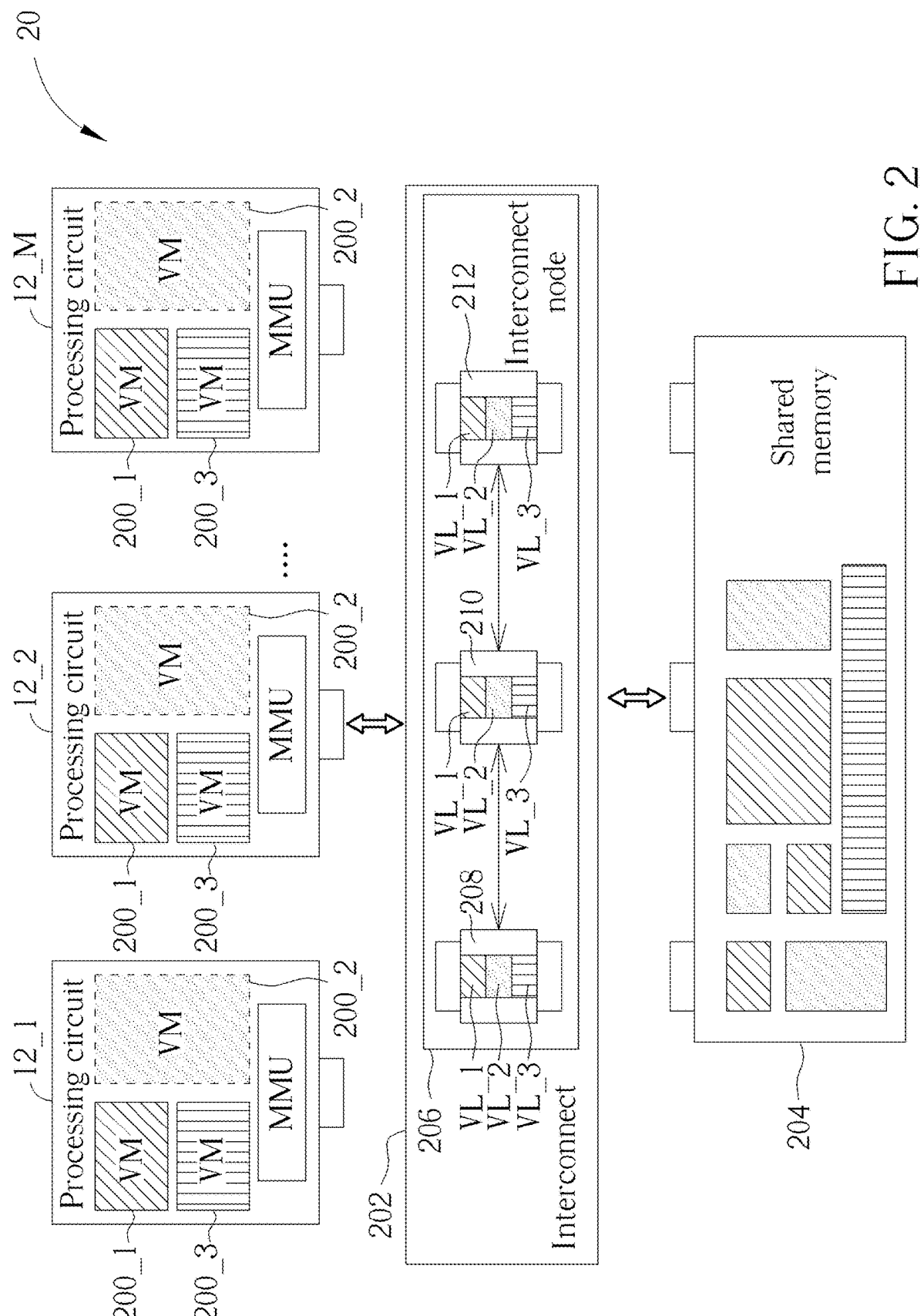
FIG. 2 is a diagram illustrating an interconnect isolation system according to an embodiment of the present invention.

FIG. 2 is a diagram illustrating an interconnect isolation system 20 according to an embodiment of the present invention. The interconnect isolation system 20 may include the processing circuits 12_1-12_M, an interconnect 202, and a shared memory 204. Each of the processing circuits 12_1-12_M may be arranged to execute software modules, including a plurality of VMs 200_1-200_N, wherein "N" is an integer greater than one. For better comprehension, in this embodiment, each of the processing circuits 12_1-12_M may be arranged to execute the VMs 200_1-200_3 (i.e., N=3). Each of the VMs 200_1-200_3 may be arranged to run different types of tasks. In addition, each of the processing circuit 12_1-12_M may include a memory management unit (MMU) (e.g., a system MMU, SMMU) shared by the VMs 200_1-200_3, wherein the MMU is arranged to achieve a memory isolation mechanism by isolating a memory usage of the shared memory 204 for each of the VMs 200_1-200_3. For example, the shared memory 204 is divided into multiple memory areas with different patterns, and each of the VMs 200_1-200_3 can correspond to at least one dedicated memory area (e.g., the VM 200_1 corresponds to multiple memory areas with a diagonal pattern from the upper right to the lower left direction, the VM 200_2 corresponds to multiple memory areas with a dotted pattern, and the VM 200_3 corresponds to a memory area with a straight line pattern), so that the memory areas used by each of the VMs 200_1-200_3 will not affect each other.

The interconnect 202 may be coupled between the VMs 200_1-200_3 and the shared memory 204, and may be shared by the VMs 200_1-200_3. The interconnect 202 may include an interconnect node 206, wherein the interconnect node 206 may include at least one transmission circuit, such as multiple transmission circuits 208, 210, and 212. However, this is for illustrative purposes only, and is not meant to be as a limitation of the present invention. In some embodiments, the interconnect node 206 may include a single transmission circuit shared by the VMs 200_1-200_3. Each of the transmission circuits 208, 210, and 212 may include multiple virtual links VL_1-VL_M implemented by hardware, wherein M is an integer greater than 1, and the virtual links VL_1-VL_M are independent of each other. For example, each of the virtual links VL_1-VL_M can be implemented by a first in first out (FIFO) circuit or a shared buffer.

In this embodiment, the VMs 200_1-200_3 are mapped to the virtual links VL_1-VL_3 (i.e., M=3), respectively. That is, the VM 200_1 corresponds to the virtual link VL_1 with a diagonal pattern from the upper right to the lower left direction, the VM 200_2 corresponds to the virtual link VL_2 with a dotted pattern, and the VM 200_3 corresponds to the virtual link VL_3 a straight line pattern. As a result, there is a one-to-one mapping relationship between the VMs 200_1-200_N and the virtual links VL_1-VL_M. However, this is for illustration only, and the present invention is not limited thereto. In practice, there may also be a one-to-many mapping relationship or a many-to-one relationship between the VMs 200_1-200_N and the virtual links VL_1-VL_M, depending upon actual design requirements. In some embodiments, at least two of the VMs 200_1-200_N are mapped to the same virtual link included in the virtual links VL_1-VL_M. For example, at least two of the VMs 200_1-200_N can be allocated to the same group for handling the same task, and can be mapped to the same virtual link. In some embodiments, the same VM included in the VMs 200_1-200_N is mapped to at least two of the virtual links VL_1-VL_M. These alternative designs all fall within the scope of the present invention.

Each of the virtual links VL_1-VL_3 may be arranged to transmit a transaction from a mapped VM to the shared memory 204, or transmit a transaction response from the shared memory 204 to the mapped VM. Considering a case where the VMs 200_1-200_N directly transmit the transactions to the shared memory 204 through multiple bus nodes coupled to each other in the interconnect 202. In this case, if an error occurs in any of the VMs 200_1-200_N, the error may propagate to each of the bus nodes and cause an entire system to crash. That is, when an error occurs in only one of the VMs 200_1-200_N, the system needs to be reset/restarted at a system level, which seriously affects the system robustness. To address this issue, the present invention maps the VMs 200_1-200_N to the virtual links VL_1-VL_M. In this way, under a condition that any of the VMs 200_1-200_N fails, the mapped virtual link(s) can be recovered without affecting other VMs and/or other interconnect paths.

It should be noted that, in this embodiment, the interconnect 202 has a single-level architecture (i.e., the VMs 200_1-200_N transmit the transactions to the shared memory 204 only through a single interconnect node in the interconnect 202). In some embodiments, the VMs 200_1-200_N may transmit the transactions to the shared memory 204 through a shared interconnect with a multi-level architecture (e.g., through multiple interconnect nodes that are coupled to each other by physical links).

Figure 3:
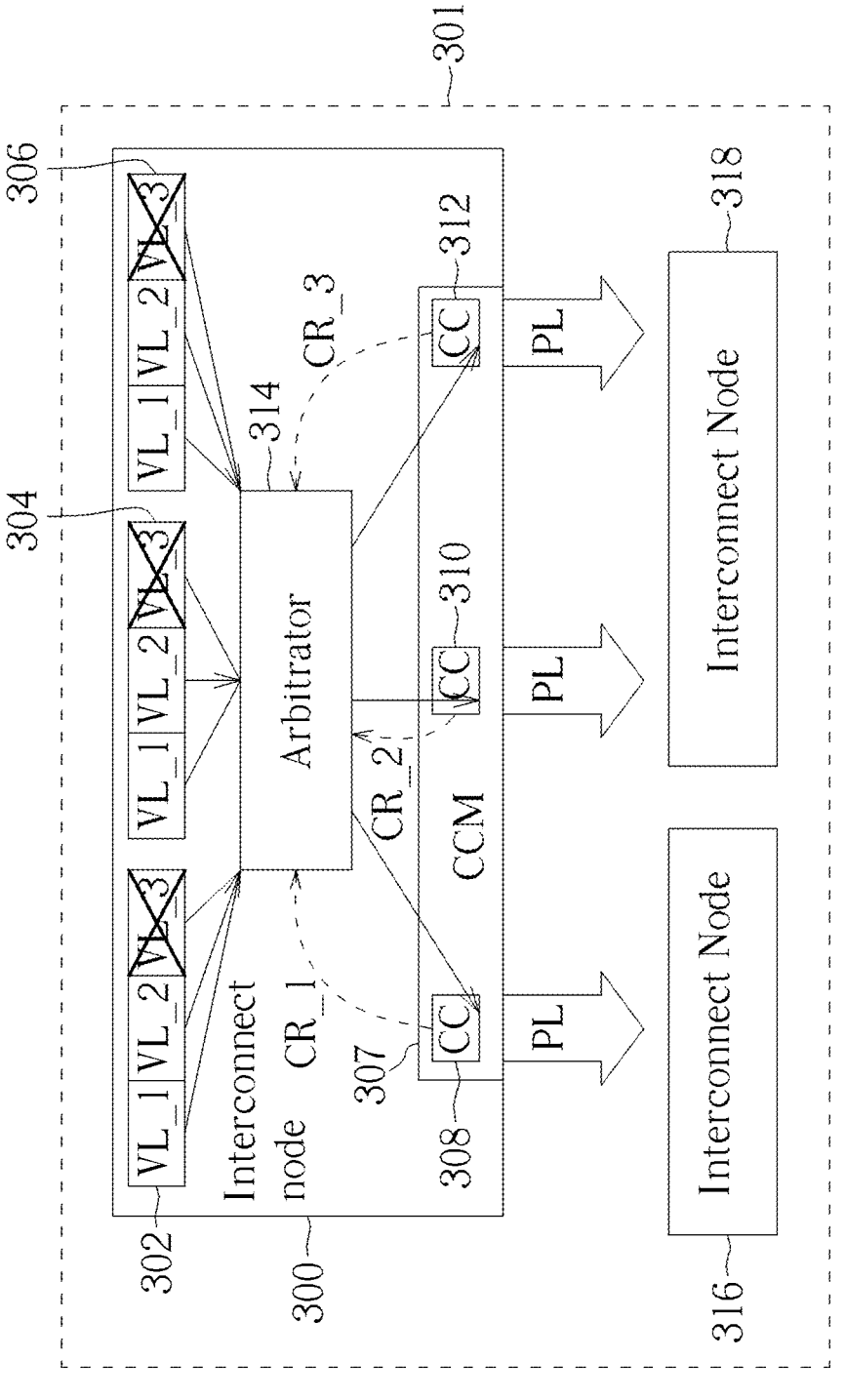
FIG. 3 is a diagram illustrating implement details of an interconnect node according to an embodiment of the present invention.

FIG. 3 is a diagram illustrating implement details of an interconnect node 300 according to an embodiment of the present invention, wherein an interconnect 301 has a multi-level architecture, and includes interconnect nodes 300, 316, and 318; each of the interconnect nodes 300, 316, and 318 have the same/similar architecture; the interconnect node 300 is a upper-level node, the interconnect nodes 316 and 318 are lower-level nodes, and the interconnect node 300 is coupled to each of the interconnect nodes 316 and 318 through physical links (labeled as "PL" in FIG. 3 for brevity); and the interconnect node 206 shown in FIG. 2 can be implemented by the interconnect node 300. As shown in FIG. 3, the interconnect node 300 may include multiple transmitting circuits 302, 304, and 306, a capacity calculator module 307 (labeled as "CCM" in FIG. 3 for brevity), and an arbitrator 314, wherein each of the transmitting circuits 302, 304, and 306 may be coupled to a VM through a physical link, and may include the virtual links VL_1-VL_3, but the present invention is not limited thereto. In some embodiments, The VMs may be coupled to a single transmission circuit through physical links, and the single transmission circuit may include multiple virtual links mapped to the VMs. For each of the VMs, the arbitrator 314 may be arranged to receive a transaction from the transmitting circuits 302, 304, and 306, and may determine whether to keep transmitting the transaction through a mapped virtual link according to a calculation result derived from the capacity calculators 308, 310, and 312.

In detail, the capacity calculator module 307 may include capacity calculators 308, 310, and 312 (labeled as "CC" in FIG. 3 for brevity), wherein the capacity calculators 308, 310, and 312 correspond to the virtual links VL_1-VL_3, respectively. Each of the capacity calculators 308, 310, and 312 may be arranged to calculate a capacity of a corresponding virtual link to generate a calculation result, wherein the calculation result indicates whether the capacity of the corresponding virtual link reaches a predetermined level, and the capacity of the corresponding virtual link is full in response to the predetermined level being reached. For example, the capacity calculator 308 may be arranged to calculate a capacity of the virtual link VL_1 to generate a calculation result CR_1 indicating whether the capacity of the virtual link VL_1 reaches the predetermined level. The capacity calculator 310 may be arranged to calculate a capacity of the virtual link VL_2 to generate a calculation result CR_2 indicating whether the capacity of the virtual link VL_2 reaches the predetermined level. The capacity calculator 312 may be arranged to calculate a capacity of the virtual link VL_3 to generate a calculation result CR_3 indicating whether the capacity of the virtual link VL_3 reaches the predetermined level.

In response to the calculation result indicating that the capacity of the corresponding virtual link does not reach the predetermined level (e.g., the capacity of the corresponding virtual link is not full), the arbitrator 314 may determine to keep transmitting the transaction through the corresponding virtual link. In response to the calculation result indicating that the capacity of the corresponding virtual link reaches the predetermined level (e.g., the capacity of the corresponding virtual link is full), the arbitrator 314 may determine not to keep transmitting the transaction through the corresponding virtual link. In this embodiment, assume that the calculation result CR_3 generated by the capacity calculator 312 indicates that the capacity of the virtual link VL_3_reaches the predetermined level. After the arbitrator 314 receives the calculation result CR_3 from the capacity calculator 312, the arbitrator 314 determines not to keep transmitting the transaction through the virtual link VL_3.

Figure 4:
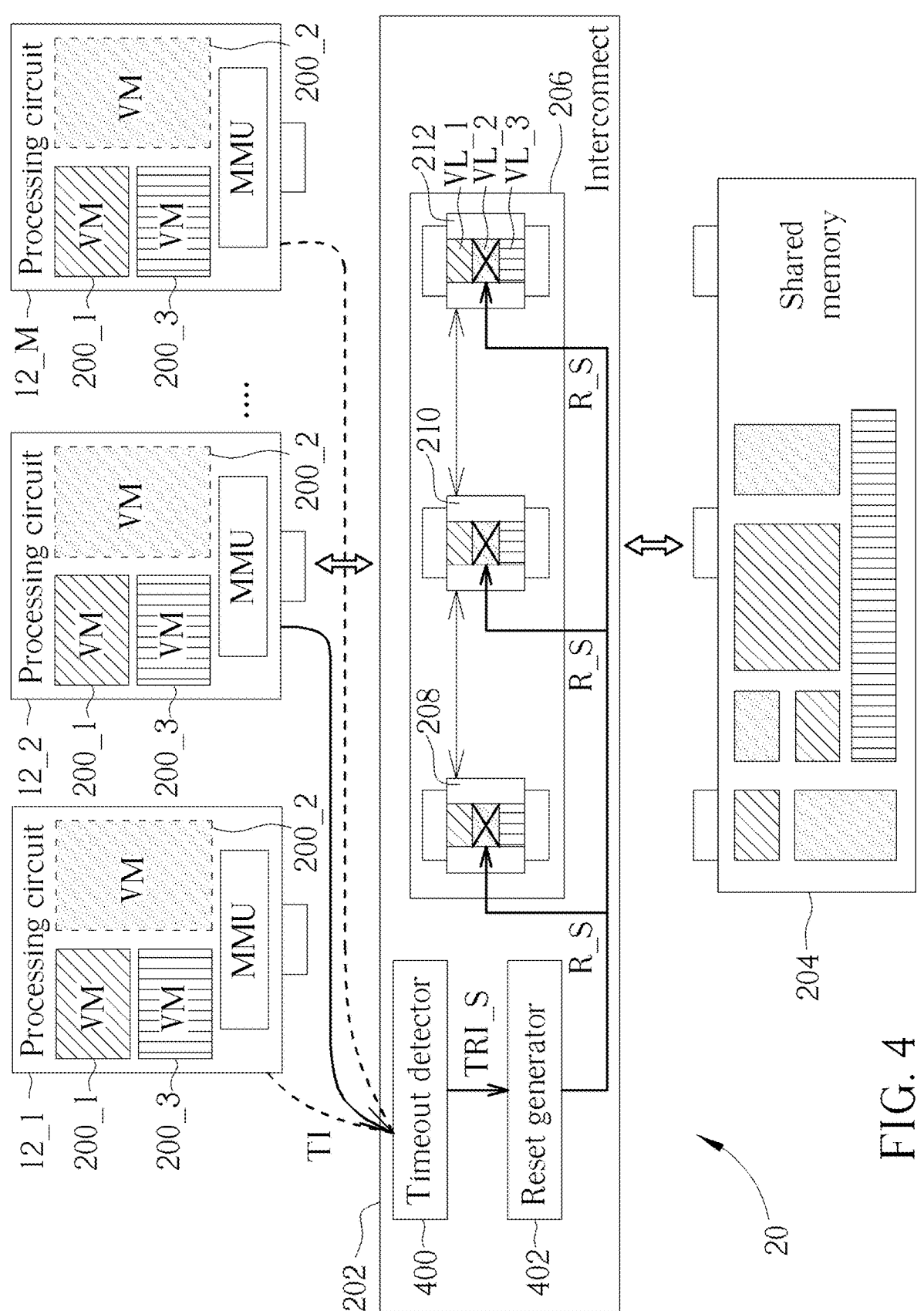
FIG. 4 is a diagram illustrating a recovery mechanism of the interconnect isolation system shown in FIG. 2 according to an embodiment of the present invention.

By isolating the interconnect 202/301 with aid of the mapping between the VMs 200_1-200_3 and the virtual links VL_1-VL_3, the interconnect isolation system 20 may support a recovery mechanism (e.g., a self-reset/self-restart function) for each of the virtual links VL_1-VL_3, which can greatly improve the robustness of the interconnect 202/301. FIG. 4 is a diagram illustrating a recovery mechanism of the interconnect isolation system 20 shown in FIG. 2 according to an embodiment of the present invention. As shown in FIG. 4, the interconnect isolation system 20 may further include a timeout detector 400 and a reset generator 402. The timeout detector 400 may be arranged to determine whether timeout information TI is received, and generate and transmit a trigger signal TRI_S to the reset generator 402 according to the timeout information TI for performing a recovery operation upon a virtual link indicated by the time information TI, wherein the timeout information TI indicates one of the virtual links VL_1-VL_3 is at an error state, and the capacity of a virtual link at the error state is full.

In this embodiment, the timeout information TI is derived from any of the VMs 200_1-200_3, and indicates the any of the VMs 200_1-200_3 does not receive the transaction response or cannot transmit the transaction through the corresponding virtual link (i.e., the timeout information TI indicates the corresponding virtual link is at the error state), but the present invention is not limited thereto. In some embodiments, the timeout information TI may be derived from any of the virtual links VL_1-VL_3. In some embodiments, the timeout information TI may be from a node on the interconnect 202, wherein the node may monitor a state of each of the VMs 200_1-200_3 and/or a state of each of the virtual links VL_1-VL_3, to generate the timeout information TI. These alternative designs all fall within the scope of the present invention.

The reset signal generator 402 may be arranged to generate and transmit a reset signal R_S to each of the transmission circuits 208, 210, and 212 according to the trigger signal TRI_S (e.g., in response to reception of the trigger signal TRI_S), to reset/restart the virtual link with the error state indicated by the timeout information TI. For example, assume that the timeout information TI derived from the VM 200_2 indicates the virtual link VL_2 is at the error state. Under this situation, the virtual link VL_2 in each of the transmission circuits 208, 210, and 212 is reset/restarted according to the reset signal R_S, and other virtual links (i.e., the virtual links VL_1 and VL_3) in each of the transmission circuits 208, 210, and 212 can operate normally.

Figure 5:
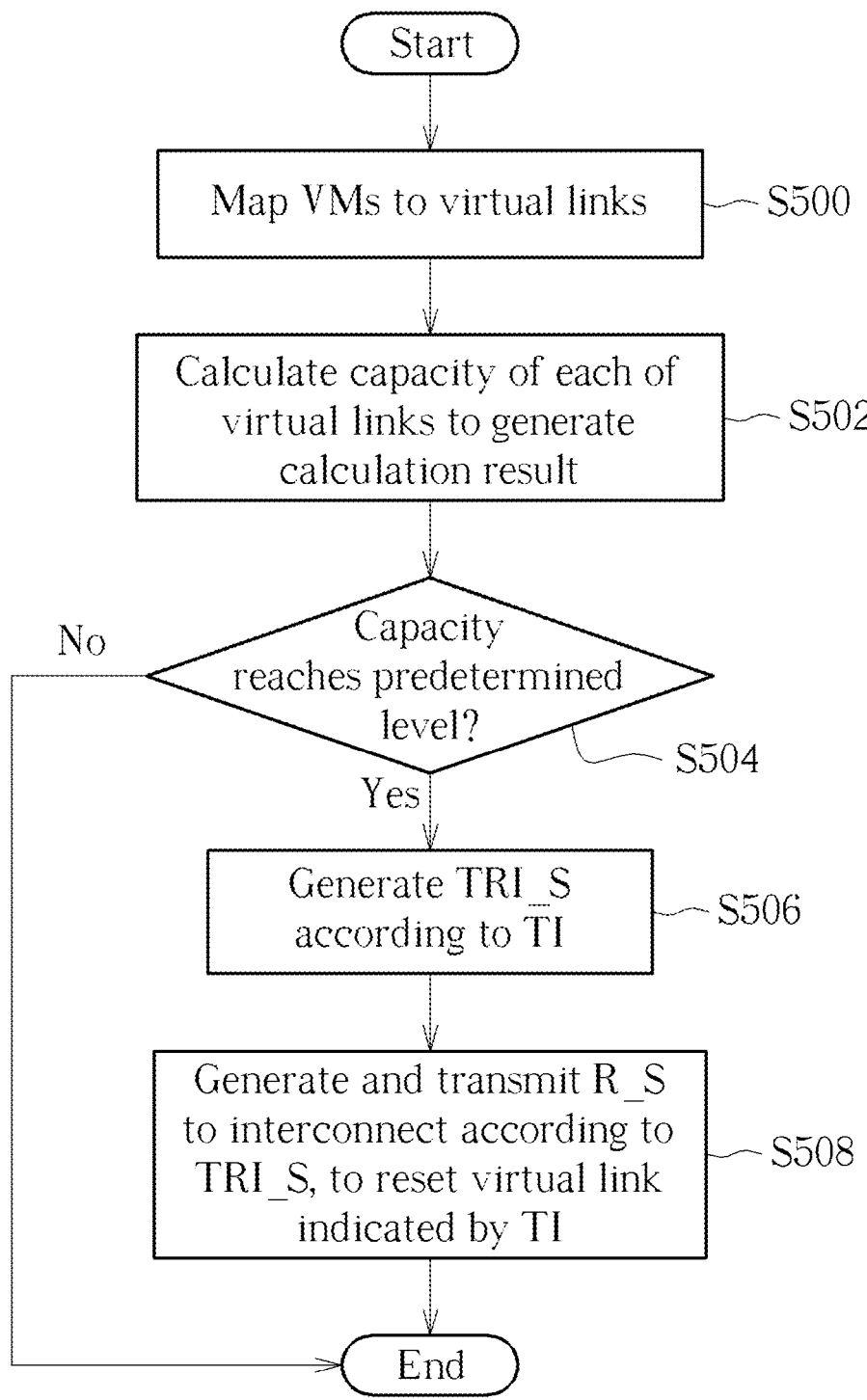
FIG. 5 is a flow chart of a method for isolating an interconnect according to an embodiment of the present invention.

FIG. 5 is a flow chart of a method for isolating an interconnect according to an embodiment of the present invention. Provided that the result is substantially the same, the steps are not required to be executed in the exact order shown in FIG. 5. For example, the method shown in FIG. 5 may be employed by the interconnect isolation system 20 shown in FIG. 2.

In Step S500, the VMs 200_1-200_N are mapped to the virtual links VL_1-VL_M, wherein for each of the VMs 200_1-200_N, a transaction is transmitted to the shared memory 204 through a mapped virtual link.

In Step S502, a capacity of each of the virtual links VL_1-VL_M is calculated to generate a calculation result, wherein the calculation result indicates whether the capacity of the each of the virtual links VL_1-VL_M reaches a predetermined level. For example, the capacity of the each of the virtual links VL_1-VL_M is full in response to the predetermined level being reached.

In Step S504, it is determined whether to keep transmitting the transaction through the each of the virtual links VL_1-VL_M according to the calculation result. In response to the calculation result indicating that the capacity of the each of the virtual links VL_1-VL_M does not reach the predetermined level, it is determined to keep transmitting the transaction through the each of the virtual links VL_1-VL_M, and the flow ends. In response to the calculation result indicating that the capacity of the each of the virtual links VL_1-VL_M reaches the predetermined level, it is determined not to keep transmitting the transaction through the each of the virtual links VL_1-VL_M, and Step S506 is entered.

In Step S506, the trigger signal TRI_S is generated according to the timeout information TI, wherein the timeout information TI indicates one of the virtual links VL_1-VL_M is at an error state.

In Step S508, the reset signal R_S is generated and transmitted to the interconnect 202 (more particularly, the transmitting circuits 208, 210, and 212) according to the trigger signal TRI_S, to reset the one of the virtual links VL_1-VL_M indicated by the timeout information TI.

In summary, by isolating an interconnect with aid of mapping between VMs and virtual links in the interconnect, under a condition that any of the VMs fails, the mapped virtual link(s) can be reset/restarted without affecting other VMS and/or other interconnect paths. That is, the interconnect isolation system of the present invention supports a recovery mechanism (e.g., a self-reset/self-restart function)

for each of the virtual links, which can greatly improve the robustness of the interconnect. In addition, compared with a case where multiple dedicated physical links of the VMs are utilized to achieve the interconnect isolation, the present invention has a lower power cost and a smaller hardware area. Additionally, the present invention can simplify a debugging operation by identifying an error through the virtual links that are independent of each other.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An interconnect isolation system, comprising:
a shared memory;
at least one processing circuit, arranged to execute a plurality of virtual machines (VMs); and
an interconnect, wherein the interconnect is shared by the plurality of VMs, and comprises:
at least one interconnect node, comprising at least one transmission circuit, wherein each of the at least one transmission circuit comprises a plurality of virtual links, the plurality of VMs are mapped to the plurality of virtual links, and each of the plurality of VMs transmits a transaction to the shared memory through a mapped virtual link;
a timeout detector, arranged to generate a trigger signal according to timeout information, wherein the timeout information indicates one of the plurality of virtual links is at an error state; and
a reset signal generator, arranged to generate and transmit a reset signal to the each of the transmission circuits according to the trigger signal, to reset the one of the plurality of virtual links indicated by the timeout information.

2. The interconnect isolation system of claim 1, wherein the plurality of VMs are mapped to the plurality of virtual links, respectively.

3. The interconnect isolation system of claim 1, wherein at least two of the plurality of VMs are mapped to a same virtual link included in the plurality of virtual links.

4. The interconnect isolation system of claim 1, wherein a same VM included in the plurality of VMs is mapped to at least two of the plurality of virtual links.

5. The interconnect isolation system of claim 1, wherein the at least one interconnect node further comprises:
a plurality of capacity calculators, wherein the plurality of capacity calculators correspond to the plurality of virtual links, respectively, each of the plurality of capacity calculators is arranged to calculate a capacity of a corresponding virtual link to generate a calculation result, and the calculation result indicates whether the capacity of the corresponding virtual link reaches a predetermined level.

6. The interconnect isolation system of claim 5, wherein the at least one interconnect node further comprises:
an arbitrator, wherein for the each of the plurality of capacity calculators, the arbitrator is arranged to receive the calculation result, and determine whether to keep transmitting the transaction through the corresponding virtual link according to the calculation result.

7. The interconnect isolation system of claim 6, wherein in response to the calculation result indicating that the capacity of the corresponding virtual link does not reach the predetermined level, the arbitrator determines to keep transmitting the transaction through the corresponding virtual link; and in response to the calculation result indicating that the capacity of the corresponding virtual link reaches the predetermined level, the arbitrator determines not to keep transmitting the transaction through the corresponding virtual link.

8. The interconnect isolation system of claim 1, wherein the timeout information is derived from any of the plurality of VMs.

9. The interconnect isolation system of claim 1, wherein the timeout information is derived from any of the plurality of virtual links.

10. The interconnect isolation system of claim 1, wherein the timeout information is derived from a node of the interconnect, and the node is arranged to monitor a state of the each of the plurality of VMs or a state of each of the plurality of virtual links, to generate the timeout information.

11. A method for isolating an interconnect, wherein the interconnect is shared by a plurality of virtual machines (VMs), and comprises a plurality of virtual links, and the method comprises:
mapping the plurality of VMs to the plurality of virtual links, wherein for each of the plurality of VMs, a transaction is transmitted to a shared memory through a mapped virtual link;
generating a trigger signal according to timeout information, wherein the timeout information indicates one of the plurality of virtual links is at an error state; and
generating and transmitting a reset signal to the interconnect according to the trigger signal, to reset the one of the plurality of virtual links indicated by the timeout information.

12. The method of claim 11, wherein the plurality of VMs are mapped to the plurality of virtual links, respectively.

13. The method of claim 11, wherein at least two of the plurality of VMs are mapped to a same virtual link included in the plurality of virtual links.

14. The method of claim 11, wherein a same VM included in the plurality of VMs is mapped to at least two of the plurality of virtual links.

15. The method of claim 11, further comprising:
calculating a capacity of each of the plurality of virtual links to generate a calculation result, wherein the calculation result indicates whether the capacity of the each of the plurality of virtual links reaches a predetermined level.

16. The method of claim 15, further comprising:
determine whether to keep transmitting the transaction through the each of the plurality of virtual links according to the calculation result.

17. The method of claim 16, wherein the step of determine whether to keep transmitting the transaction through the each of the plurality of virtual links according to the calculation result comprises:
in response to the calculation result indicating that the capacity of the each of the plurality of virtual links does not reach the predetermined level, determining to keep transmitting the transaction through the each of the plurality of virtual links; and
in response to the calculation result indicating that the capacity of the each of the plurality of virtual links reaches the predetermined level, determining not to keep transmitting the transaction through the each of the plurality of virtual links.

18. The method of claim 11, wherein the timeout information is derived from any of the plurality of VMs.

19. The method of claim 11, wherein the timeout information is derived from any of the plurality of virtual links.

20. The method of claim 11, wherein the timeout information is derived from a node of the interconnect, and the node is arranged to monitor a state of the each of the plurality of VMs or a state of each of the plurality of virtual links, to generate the timeout information.

\* \* \* \* \*